US007509402B2

(12) United States Patent  (10) Patent No.: US 7,509,402 B2
Moorer et al.  (45) Date of Patent: Mar. 24, 2009

(54) AUTOMATION CONTROL SYSTEM HAVING A CONFIGURATION TOOL AND TWO-WAY ETHERNET COMMUNICATION FOR WEB SERVICE MESSAGING, DISCOVERY, DESCRIPTION, AND EVENTING THAT IS CONTROLLABLE WITH A TOUCH-SCREEN DISPLAY

(75) Inventors: Seale Moorer, Westerville, OH (US); Eric Eichensehr, Westerville, OH (US)

(73) Assignee: Exceptional Innovation, LLC, Westerville, OH (US)

( * ) Notice: Subject to any disclaimer, the term of this patent is extended or adjusted under 35 U.S.C. 154(b) by 0 days.

(21) Appl. No.: 11/686,896

(22) Filed: Mar. 15, 2007

(65) Prior Publication Data
US 2007/0225867 A1  Sep. 27, 2007

Related U.S. Application Data

(60) Provisional application No. 60/782,734, filed on Mar. 16, 2006, provisional application No. 60/782,598, filed on Mar. 16, 2006, provisional application No. 60/782,635, filed on Mar. 16, 2006, provisional application No. 60/782,596, filed on Mar. 16, 2006, provisional application No. 60/782,599, filed on Mar. 16, 2006, provisional application No. 60/782,600, filed on Mar. 16, 2006, provisional application No. 60/782,634, filed on Mar. 16, 2006, provisional application No. 60/782,595, filed on Mar. 16, 2006, provisional application No. 60/785,275, filed on Mar. 24, 2006, provisional application No. 60/793,257, filed on Apr. 20, 2006, provisional application No. 60/747,726, filed on May 19, 2006, provisional application No. 60/746,287, filed on May 3, 2006, provisional application No. 60/786,119, filed on Mar. 27, 2006, provisional application No. 60/857,774, filed on Nov. 9, 2006.

(51) Int. Cl.
G06F 15/177 (2006.01)
G06F 15/16 (2006.01)
H04M 3/00 (2006.01)

(52) U.S. Cl. .................. 709/220; 709/217; 709/227; 709/230; 455/419

(58) Field of Classification Search .................. None
See application file for complete search history.

(56) References Cited

U.S. PATENT DOCUMENTS

| 4,567,557 A | 1/1986 | Burns |
| 4,808,841 A | 2/1989 | Ito et al. |
| 4,989,081 A | 1/1991 | Miyagawa |
| 5,086,385 A | 2/1992 | Launey et al. |

(Continued)

Primary Examiner—Wen-Tai Lin
(74) Attorney, Agent, or Firm—McGuireWoods LLP

(57) ABSTRACT

An automation system and process of operating an automation system in a Web Service environment, includes providing at least one client and at least one device, the at least one client and the at least one device configured with a web services for devices stack protocol, connecting a network includes at least one server with the web services for devices to the at least one client and the at least one device, and transmitting automation-based control and communication between the at least one client and at least one device, wherein the at least one client comprises one of a touch screen display and a handheld controller and the at least one device comprises an audio system, a video system, an intercom system, a lighting system, a security system, a link, and a HVAC system.

24 Claims, 10 Drawing Sheets

U.S. PATENT DOCUMENTS

| | | |
|---|---|---|
| 5,105,186 A | 4/1992 | May |
| 5,218,552 A | 6/1993 | Stirk |
| 5,237,305 A | 8/1993 | Ishijuro |
| 5,579,221 A | 11/1996 | Mun |
| 5,598,523 A | 1/1997 | Fujita |
| 5,621,662 A | 4/1997 | Humphries et al. |
| 5,666,172 A | 9/1997 | Ida et al. |
| 5,706,191 A | 1/1998 | Bassett et al. |
| 5,706,290 A | 1/1998 | Shaw et al. |
| 5,748,444 A | 5/1998 | Honda et al. |
| 5,787,259 A | 7/1998 | Haroun |
| 5,850,340 A | 12/1998 | York |
| 5,877,957 A | 3/1999 | Bennett |
| 5,922,047 A | 7/1999 | Newlin et al. |
| 5,956,025 A | 9/1999 | Goulden et al. |
| 6,020,881 A | 2/2000 | Naughton et al. |
| 6,029,092 A | 2/2000 | Stein |
| 6,061,602 A | 5/2000 | Meyer |
| 6,112,127 A | 8/2000 | Bennett |
| 6,139,177 A | 10/2000 | Venkatraman et al. |
| 6,147,601 A | 11/2000 | Sandelman et al. |
| 6,154,681 A | 11/2000 | Drees et al. |
| 6,160,477 A | 12/2000 | Sandelman et al. |
| 6,175,872 B1 | 1/2001 | Neumann et al. |
| 6,182,094 B1 | 1/2001 | Humpleman et al. |
| 6,192,282 B1 | 2/2001 | Smith et al. |
| 6,198,479 B1 | 3/2001 | Humpleman et al. |
| 6,201,523 B1 | 3/2001 | Akiyama et al. |
| 6,222,729 B1 | 4/2001 | Yoshikawa |
| 6,243,707 B1 | 6/2001 | Humpleman et al. |
| 6,263,260 B1 | 7/2001 | Bodmer et al. |
| 6,275,922 B1 | 8/2001 | Bertsch |
| 6,278,676 B1 | 8/2001 | Anderson et al. |
| 6,288,716 B1 | 9/2001 | Humpleman et al. |
| 6,313,990 B1 | 11/2001 | Cheon |
| 6,314,326 B1 | 11/2001 | Fuchu |
| 6,353,853 B1 | 3/2002 | Gravlin |
| 6,385,495 B1 | 5/2002 | Bennett |
| 6,389,331 B1 | 5/2002 | Jensen et al. |
| 6,402,109 B1 | 6/2002 | Dittmer |
| 6,405,103 B1 | 6/2002 | Ryan et al. |
| 6,456,892 B1 | 9/2002 | Dara-Abrams et al. |
| 6,462,654 B1 | 10/2002 | Sandelman et al. |
| 6,473,661 B1 | 10/2002 | Wollner |
| 6,496,575 B1 | 12/2002 | Vasell et al. |
| 6,522,346 B1 | 2/2003 | Meyer |
| 6,523,696 B1 | 2/2003 | Saito et al. |
| 6,526,581 B1 | 2/2003 | Edson |
| 6,546,419 B1 | 4/2003 | Humpleman |
| 6,580,950 B1 | 6/2003 | Johnson et al. |
| 6,587,739 B1 | 7/2003 | Abrams et al. |
| 6,609,038 B1 | 8/2003 | Croswell et al. |
| 6,615,088 B1 | 9/2003 | Myer et al. |
| 6,633,781 B1 | 10/2003 | Lee et al. |
| 6,640,141 B2 | 10/2003 | Bennett |
| 6,663,781 B1 | 12/2003 | Huling |
| 6,690,411 B2 | 2/2004 | Naidoo et al. |
| 6,690,979 B1 | 2/2004 | Smith |
| 6,735,619 B1 | 5/2004 | Sawada |
| 6,756,998 B1 | 6/2004 | Bilger |
| 6,763,040 B1 | 7/2004 | Hite et al. |
| 6,778,868 B2 | 8/2004 | Imamura et al. |
| 6,782,294 B2 | 8/2004 | Reich et al. |
| 6,792,319 B1 | 9/2004 | Bilger |
| 6,792,323 B2 | 9/2004 | Krzyzanowski et al. |
| 6,823,223 B2 | 11/2004 | Gonzales et al. |
| 6,834,208 B2 | 12/2004 | Gonzales et al. |
| 6,838,978 B2 | 1/2005 | Aizu et al. |
| 6,845,275 B2 | 1/2005 | Gasiorek et al. |
| 6,850,149 B2 | 2/2005 | Park |
| 6,859,669 B2 | 2/2005 | An |
| 6,865,428 B2 | 3/2005 | Gonzales et al. |
| 6,868,292 B2 | 3/2005 | Ficco |
| 6,868,293 B1 | 3/2005 | Schurr et al. |
| 6,870,555 B2 | 3/2005 | Sekiguchi |
| 6,891,838 B1 | 5/2005 | Petite |
| 6,912,429 B1 | 6/2005 | Bilger |
| 6,924,727 B2 | 8/2005 | Nagaoka et al. |
| 6,928,576 B2 | 8/2005 | Sekiguchi |
| 6,930,599 B2 | 8/2005 | Naidoo et al. |
| 6,957,110 B2 | 10/2005 | Wewalaarachchi et al. |
| 6,957,275 B1 | 10/2005 | Sekiguchi |
| 6,961,763 B1 | 11/2005 | Wang et al. |
| 6,965,935 B2 | 11/2005 | Diong |
| 6,967,565 B2 | 11/2005 | Lingermann |
| 6,980,868 B2 | 12/2005 | Huang et al. |
| 6,990,379 B2 | 1/2006 | Gonzales et al. |
| 7,047,092 B2 | 5/2006 | Wimsatt |
| 7,170,422 B2 | 1/2007 | Nelson et al. |
| 7,200,683 B1 * | 4/2007 | Wang et al. .................. 709/250 |
| 7,203,486 B2 | 4/2007 | Patel |
| 7,370,280 B2 * | 5/2008 | Ho et al. ...................... 715/762 |
| 7,380,250 B2 | 5/2008 | Schechter et al. |
| 2001/0034754 A1 | 10/2001 | Elwahab et al. |
| 2001/0036192 A1 | 11/2001 | Chiles et al. |
| 2001/0039460 A1 | 11/2001 | Aisa |
| 2002/0000092 A1 | 1/2002 | Sharood et al. |
| 2002/0016639 A1 | 2/2002 | Smith |
| 2002/0029085 A1 | 3/2002 | Park |
| 2002/0031120 A1 | 3/2002 | Rakib |
| 2002/0033760 A1 | 3/2002 | Kobayashi |
| 2002/0035404 A1 | 3/2002 | Ficco et al. |
| 2002/0044042 A1 | 4/2002 | Christensen |
| 2002/0047774 A1 | 4/2002 | Christensen |
| 2002/0111698 A1 | 8/2002 | Graziano et al. |
| 2002/0152311 A1 | 10/2002 | Veltman et al. |
| 2002/0165953 A1 | 11/2002 | Diong |
| 2002/0180579 A1 | 12/2002 | Nagaoka et al. |
| 2002/0194328 A1 | 12/2002 | Hallenbeck |
| 2002/0196158 A1 | 12/2002 | Lee |
| 2003/0009515 A1 | 1/2003 | Lee et al. |
| 2003/0009537 A1 * | 1/2003 | Wang ........................ 709/219 |
| 2003/0028270 A1 | 2/2003 | Peterson et al. |
| 2003/0033028 A1 | 2/2003 | Bennett |
| 2003/0037166 A1 | 2/2003 | Ueno et al. |
| 2003/0040812 A1 | 2/2003 | Gonzales et al. |
| 2003/0040813 A1 | 2/2003 | Gonzales et al. |
| 2003/0040819 A1 | 2/2003 | Gonzales |
| 2003/0065407 A1 | 4/2003 | Johnson et al. |
| 2003/0069887 A1 * | 4/2003 | Lucovsky et al. ............. 707/10 |
| 2003/0074088 A1 | 4/2003 | Gonzales |
| 2003/0083758 A1 | 5/2003 | Williamson |
| 2003/0101304 A1 | 5/2003 | King et al. |
| 2003/0198938 A1 | 10/2003 | Murray |
| 2003/0200009 A1 | 10/2003 | von Kannewurff |
| 2004/0003051 A1 | 1/2004 | Krzyzanowski et al. |
| 2004/0004810 A1 | 1/2004 | Kim |
| 2004/0010327 A1 | 1/2004 | Terashima et al. |
| 2004/0010561 A1 | 1/2004 | Kim |
| 2004/0039459 A1 | 2/2004 | Daugherty et al. |
| 2004/0092282 A1 | 5/2004 | Kim et al. |
| 2004/0133314 A1 | 7/2004 | Ehlers |
| 2004/0138768 A1 | 7/2004 | Murray |
| 2004/0143629 A1 | 7/2004 | Bodin et al. |
| 2004/0176877 A1 | 9/2004 | Hesse |
| 2004/0213384 A1 | 10/2004 | Alles |
| 2004/0215694 A1 | 10/2004 | Podolsky |
| 2004/0215778 A1 | 10/2004 | Hesse et al. |
| 2004/0215816 A1 | 10/2004 | Hayes et al. |
| 2004/0237107 A1 | 11/2004 | Staples |
| 2004/0243257 A1 | 12/2004 | Theimer |
| 2004/0249922 A1 | 12/2004 | Hackman |
| 2004/0260407 A1 | 12/2004 | Wimsatt |
| 2004/0260427 A1 | 12/2004 | Wimsatt |

| | | | | | |
|---|---|---|---|---|---|
| 2004/0266439 A1* | 12/2004 | Lynch et al. ............... 455/444 | 2005/0132405 A1 | 6/2005 | AbiEzzi |
| 2004/0267385 A1 | 12/2004 | Lingemann | 2005/0149758 A1 | 7/2005 | Park |
| 2004/0267876 A1* | 12/2004 | Kakivaya et al. ............ 709/200 | 2005/0159823 A1 | 7/2005 | Hayes et al. |
| 2004/0267909 A1 | 12/2004 | Autret | 2005/0198063 A1 | 9/2005 | Thomas et al. |
| 2005/0009498 A1 | 1/2005 | Ho | 2005/0198188 A1 | 9/2005 | Hickman |
| 2005/0021805 A1 | 1/2005 | De Petris et al. | 2005/0198304 A1* | 9/2005 | Oliver et al. ............... 709/227 |
| 2005/0035717 A1 | 2/2005 | Adamson | 2005/0232583 A1 | 10/2005 | Kubota |
| 2005/0055108 A1 | 3/2005 | Gonzales | 2005/0262227 A1 | 11/2005 | Heller et al. |
| 2005/0071419 A1 | 3/2005 | Lewontin | 2005/0267605 A1 | 12/2005 | Lee et al. |
| 2005/0080879 A1 | 4/2005 | Kim et al. | 2005/0271355 A1 | 12/2005 | Gilor |
| 2005/0085930 A1 | 4/2005 | Gonzales | 2006/0004920 A1 | 1/2006 | Hallenbeck |
| 2005/0090915 A1 | 4/2005 | Geiwitz | 2006/0009861 A1 | 1/2006 | Bonasia et al. |
| 2005/0096753 A1 | 5/2005 | Arling et al. | 2006/0020353 A1 | 1/2006 | Gonzales et al. |
| 2005/0107897 A1 | 5/2005 | Callaghan | 2006/0053234 A1 | 3/2006 | Kumar et al. |
| 2005/0108091 A1 | 5/2005 | Sotak | 2006/0058900 A1 | 3/2006 | Johanson et al. |
| 2005/0113021 A1 | 5/2005 | Gosieski Jr. et al. | 2006/0106933 A1 | 5/2006 | Huang et al. |
| 2005/0113943 A1 | 5/2005 | Nian | 2006/0126646 A1 | 6/2006 | Bedingfield, Sr. |
| 2005/0119767 A1 | 6/2005 | Kiwimagi et al. | 2006/0155802 A1 | 7/2006 | He et al. |
| 2005/0119793 A1 | 6/2005 | Amundson et al. | 2007/0053376 A1 | 3/2007 | Oshima et al. |
| 2005/0125083 A1 | 6/2005 | Kiko | 2007/0083679 A1 | 4/2007 | Kikuchi |
| 2005/0131551 A1 | 6/2005 | Ruutu | 2007/0104332 A1 | 5/2007 | Clemens et al. |
| 2005/0131553 A1 | 6/2005 | Yoon et al. | | | |
| 2005/0131558 A1 | 6/2005 | Braithwaite | * cited by examiner | | |

AUTOMATION CONTROL SYSTEM HAVING A CONFIGURATION TOOL AND TWO-WAY ETHERNET COMMUNICATION FOR WEB SERVICE MESSAGING, DISCOVERY, DESCRIPTION, AND EVENTING THAT IS CONTROLLABLE WITH A TOUCH-SCREEN DISPLAY

CROSS REFERENCE TO RELATED APPLICATIONS

This application claims priority to and the benefit of: Provisional Patent Application No. 60/782,734, file on Mar. 16, 2006, entitled AUTOMATION CONTROL SYSTEM HAVING A CONFIGURATION TOOL AND TWO-WAY ETHERNET COMMUNICATION FOR WEB SERVICE MESSAGING, DISCOVERY, DESCRIPTIONS, AND EVENTING THAT IS CONTROLLABLE WITH A TOUCH-SCREEN DISPLAY, to Seale MOORER et al.; Provisional Patent Application No. 60/782,596 filed on Mar. 16, 2006, entitled AUTOMATION CONTROL SYSTEM HAVING DIGITAL MEDIA STREAMING, to Seale MOORER et al., Provisional Patent Application No. 60/782,598 filed on Mar. 16, 2006, entitled AUTOMATION CONTROL SYSTEM HAVING DIGITAL LOGGING, to Seale MOORER et al., Provisional Patent Application No. 60/782,635 filed on Mar. 16, 2006, entitled AUTOMATION CONTROL SYSTEM HAVING A CONTROL PANEL, to Seale MOORER et al.; Provisional Patent Application No. 60/782,599 filed on Mar. 16, 2006, entitled AUTOMATION CONTROL SYSTEM HAVING A CONFIGURATION TOOL, to Seale MOORER et al., Provisional Patent Application No. 60/782,600 filed on Mar. 16, 2006, entitled AUTOMATION CONTROL SYSTEM HAVING DEVICE SCRIPTING, to Seale MOORER et al.; Provisional Patent Application No. 60/782,634 filed on Mar. 16, 2006, entitled DEVICE AUTOMATION USING NETWORKED DEVICE CONTROL HAVING A WEB SERVICES FOR DEVICE STACK, to Seale MOORER et al.; Provisional Patent Application No. 60/782,595 filed on Mar. 16, 2006, entitled WIRELESS DIGITAL AMPLIFIER CONFIGURED FOR WALL MOUNTING, SHELF MOUNTING, AND THE LIKE, to Seale MOORER et al., Provisional Patent Application No. 60/785,275 filed on Mar. 24, 2006, entitled AUTOMATION SYSTEM, to Seale MOORER et al.; Provisional Patent Application No. 60/793,257 filed on Apr. 20, 2006, entitled TOUCH SCREEN FOR USE WITH AUTOMATION SYSTEMS, to Seale MOORER et al.; Provisional Patent Application No. 60/747,726 filed on May 19, 2006, entitled COOLING DEVICE FOR A TOUCH SCREEN AND THE LIKE, to Seale MOORER et al.; Provisional Patent Application No. 60/746,287 filed on May 3, 2006, entitled HOME AUTOMATION SYSTEM AND THE LIKE, to Seale MOORER et al.; Provisional Patent Application No. 60/786,119 filed on Mar. 27, 2006, entitled HOME AUTOMATION PROGRAM CODE FOR SET TOP BOX OR SIMILAR CIRCUIT, to Steve CASHMAN; and Provisional Patent Application No. 60/857,774 filed Nov. 9, 2006, entitled PORTABLE MULTI-FUNCTIONAL MEDIA DEVICE, to Seale MOORER et al., all of which are hereby expressly incorporated by reference for all purposes as if fully set forth herein. Further, this application is related to the following U.S. patent applications: U.S. patent application Ser. No. 11/686,826, entitled NETWORK BASED DIGITAL ACCESS POINT DEVICE, filed Mar. 5, 2007, to Seale Moorer, et al., having Attorney Docket No.: 2047672-5013US; U.S. patent application Ser. No. 11/686,836, entitled INTERNET PROTOCOL BASED MEDIA STREAMING SOLUTION, filed Mar. 15, 2007, to Seale Moorer, et al., having Attorney Docket No.: 2047672-5014US; U.S. patent application Ser. No. 11/686,884, entitled AUTOMATION CONTROL SYSTEM HAVING DIGITAL LOGGING, filed Mar. 15, 2007, to Seale Moorer, et al., having Attorney Docket No.: 2047672-5018US: U.S. patent application Ser. No. 11/686,893, entitled USER CONTROL INTERFACE FOR CONVERGENCE AND AUTOMATION SYSTEM, filed Mar. 15, 2007, to Seale Moorer, et al., having Attorney Docket No.: 2046762-5109US; U.S. patent application Ser. No. 11/686,846, entitled DEVICE AUTOMATION USING NETWORKED DEVICE CONTROL HAVING A WEB SERVICES FOR DEVICES STACK, filed Mar. 15, 2007, to Seale Moorer, et al., having Attorney Docket No.: 2047672-5020US; U.S. patent application Ser. No. 11/686,875, entitled AUTOMATION CONTROL SYSTEM HAVING A CONFIGURATION TOOL, filed Mar. 15, 2007, to Seale Moorer, et al., having Attorney Docket No.: 2047672-5022US; and U.S. patent Application No. 11/686,889, entitled AUTOMATION CONTROL SYSTEM HAVING DEVICE SCRIPTING, filed Mar. 15, 2007, to Seale Moorer, et al., having Attorney Docket No.: 2047672-5023US; which are all hereby expressly incorporated by reference for all purposes as if fully set forth herein.

BACKGROUND OF THE INVENTION

1. Field of the Invention

The invention is directed to multiple device control and convergence, and more particularly to multiple device addressing, discovery, description, control, eventing, and convergence in a Web Service environment, and control through an input device.

2. Related Art

Household, academic and/or business spaces now more commonly have more than one audio or video device such as CD/DVD player, portable MP3 player, tuner, preamp, power amp, speakers, VCR, DVR, computers running media players or connected to some other source of audio or video (e.g., Internet radio, satellite radio and the like), etc. Typically, a CD/DVD player from one company comes with its own remote control and an amplifier by an entirely different company comes with its own remote control. The same space may have a PC with its keyboard and mouse, and yet another company's portable MP3 player with its own control switches. While each audio device is doing precisely what it was designed to do, each operates completely independent from the others with the possible exception of the portable MP3 player that may be connected to a PC for synchronization. As a result, a user ends up going from one keypad to another or juggling a series of remote controls in order to control the devices.

Since these audio/video and similar devices are not designed to communicate with each other or their communication is very limited, access to these audio/video devices is limited by their physical locations. For example, it is difficult to play an MP3 file saved in a PC hard disk drive in one room or area (a child's bedroom) on speakers located in another room or area (an entertainment room). Thus, in order for a user to enjoy music of his or her choice whenever and wherever he or she wants, each room needs to be equipped with all the necessary audio/video equipment and digital audio/video content.

Also, the audio/video devices are not designed to communicate with other devices (e.g., TV, lighting, security system, etc.). Thus, it is difficult, if not impossible, to converge the devices for common control for certain occasions. For example, in order to watch a movie, the user must turn on a TV, a DVD player and an audio amplifier by using three different remote controls. Then the user must set the TV to receive a video signal from the DVD player, set the audio amplifier to receive an audio signal from the DVD player and use another control unit to adjust the lighting of the room. Even when a user utilizes a universal remote, as is known in the art, the result is a plurality of devices that are separately operated and are operated separately from a single universal remote. These devices do not converge as described above because the devices lack any ability to easily connect and effectively communicate with each other, and be controlled by a single input device.

Accordingly, there is a need for a solution for the aforementioned accessibility, connectability and convergence issues to allow devices to connect, communicate and be controlled.

SUMMARY OF THE INVENTION

The invention meets the foregoing needs using an automation specific IP based automation protocol, which results in a significant increase in discovery and communications between devices along with an IP based input device and other advantages apparent from the discussion herein.

Accordingly, in one aspect of the invention, a process of operating an automation system in a Web Service environment includes the steps of providing at least one client and at least one device, the at least one client and the at least one device configured with a web services for devices stack protocol, connecting a network includes at least one server with the web services for devices to the at least one client and the at least one device, and transmitting automation-based control and communication between the at least one client and at least one device, wherein the at least one client comprises one of a touch screen display and a handheld controller and the at least one device comprises an audio system, a video system, an intercom system, a lighting system, a security system, a link, and a HVAC system.

One of the touch screen display and the handheld controller may include at least one of a LCD display, processor, wireless interface, wired interface, IR interface, audio system, inputs, support base, and knob. The at least one client further may include one of a TV, a personal computer, a personal digital assistant, and a game controller. The web services for devices stack protocol may include a services tier that provides communication via at least one of HTTP and UDP wherein the communication via HTTP and UDP may include information contained in SOAP packets, and a logical interface with the at least one client, and the web services for devices stack protocol may include a web service for each at least one device. The web services for devices stack protocol may include a service provider configured as a generic host for web services. The web services for devices stack protocol further may include one of a component configured to host multiple services, and a controller configured to communicate with the at least one device and wherein the web services for devices stack protocol further may include a device bridge configured to translate commands for the devices. The controller may be configured to send feedback from the at least one device to the at least one client. The web services for devices stack protocol configured to communicate with the at least one device in a native format and the native format may include at least one of HTTP, TCP, UDP, and serial protocols. The web services for devices protocol may be configured to discover the at least one client and the discovery may include one of multicast announcements, multicast query requests, and unicast responses. The web services for devices protocol may be configured for description and the description may include at least one of WS-Metadata exchange, web services description language, and simple object access protocol/XML protocol. The web services for devices protocol may be configured for eventing and wherein the eventing may include at least one of web services description language for detailed events, a configuration for client subscription to events, and a configuration for the at least one device to push events to the at least one client.

Accordingly, in another aspect of the invention, a machine-readable medium includes instructions stored therewith, which, when executed by a processor cause the processor to establish an automation system in a Web Service environment, the machine-reachable medium includes instructions for providing automation-based control and communication between at least one client and at least one device, the at least one client and the at least one device configured with a web services for devices stack protocol configured to the at least one client and at least one device, and instructions for configuring a network includes at least one server to be connected to the at least one client and the at least one device with the web services for devices, wherein the at least one client may include one of a touch screen display and a handheld controller and the at least one device may include an audio system, a video system, an intercom system, a lighting system, a security system, a link, and a HVAC system.

One of the touch screen display and the handheld controller may include at least one of a LCD display, processor, wireless interface, wired interface, IR interface, audio system, inputs, support base, and knob. The at least one client further may include one of a TV, a personal computer, a personal digital assistant, and a game controller. The web services for devices stack protocol may include a services tier that provides communication via at least one of HTTP and UDP wherein the communication via HTTP and UDP comprises information contained in SOAP packets, and a logical interface with the at least one client, and the web services for devices stack protocol comprises a web service for each at least one device. The web services for devices stack protocol further may include a device bridge configured to translate commands for the devices, and a service provider configured as a generic host for web services. The web services for devices stack protocol further may include a component configured to host multiple services, and a controller configured to communicate with the at least one device. The controller may be configured to send feedback from the at least one device to the at least one client. The web services for devices stack protocol may be configured to communicate with the at least one device in a native format and the native format may include at least one of HTTP, TCP, UDP, and serial protocols. The web services for devices protocol may be configured to discover the at least one client and the discovery may include one of multicast announcements, multicast query requests, and unicast responses. The web services for devices protocol may be configured for description and the description may include at least one of WS-Metadata exchange, web services description language, and simple object access protocol/XML protocol. The web services for devices protocol may be configured for eventing and wherein the eventing may include at least one of web services description language for detailed events, a configuration for client subscription to events, and a configuration for the at least one device to push events to the at least one client.

Accordingly, in yet another aspect of the invention, an automation system operating in a Web Service for Devices environment includes at least one client and at least one device, the at least one client and the at least one device configured with a web services for devices stack protocol configured to provide automation-based control and communication between the at least one client and at least one device, and a network includes at least one server configured to be connected to the at least one client and the at least one device with the web services for devices, wherein the at least one client may include one of a touch screen display and a handheld controller and the at least one device may include an audio system, a video system, an intercom system, a lighting system, a security system, a link, and a HVAC system.

One of the touch screen display and the handheld controller may include at least one of a LCD display, processor, wireless interface, wired interface, IR interface, audio system, inputs, support base, and knob. The at least one client further may include one of a TV, a personal computer, a personal digital assistant, and a game controller. The a web services for devices stack protocol may include a services tier that provides communication via at least one of HTTP and UDP wherein the communication via HTTP and UDP may include information contained in SOAP packets, and a logical interface with the at least one client, and the web services for devices stack protocol may include a web service for each at least one device, and a service provider configured as a generic host for web services. The web services for devices stack protocol further may include a device bridge configured to translate commands for the devices, and a service provider configured as a generic host for web services. The web services for devices stack protocol further may include a component configured to host multiple services, and a controller configured to communicate with the at least one device.

The controller may be configured to send feedback from the at least one device to the at least one client. The web services for devices stack protocol may be configured to communicate with the at least one device in a native format and the native format may include at least one of HTTP, TCP, UDP, and serial protocols. The web services for devices protocol may be configured to discover the at least one client and the discovery may include one of multicast announcements, multicast query requests, and unicast responses. The web services for devices protocol may be configured for description and the description may include at least one of WS-Metadata exchange, web services description language, and simple object access protocol/XML protocol. The web services for devices protocol may be configured for eventing and wherein the eventing may include at least one of web services description language for detailed events, a configuration for client subscription to events, and a configuration for the at least one device to push events to the at least one client.

Additional features of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced. In the drawings.

DETAILED DESCRIPTION OF THE INVENTION

Figure 1:
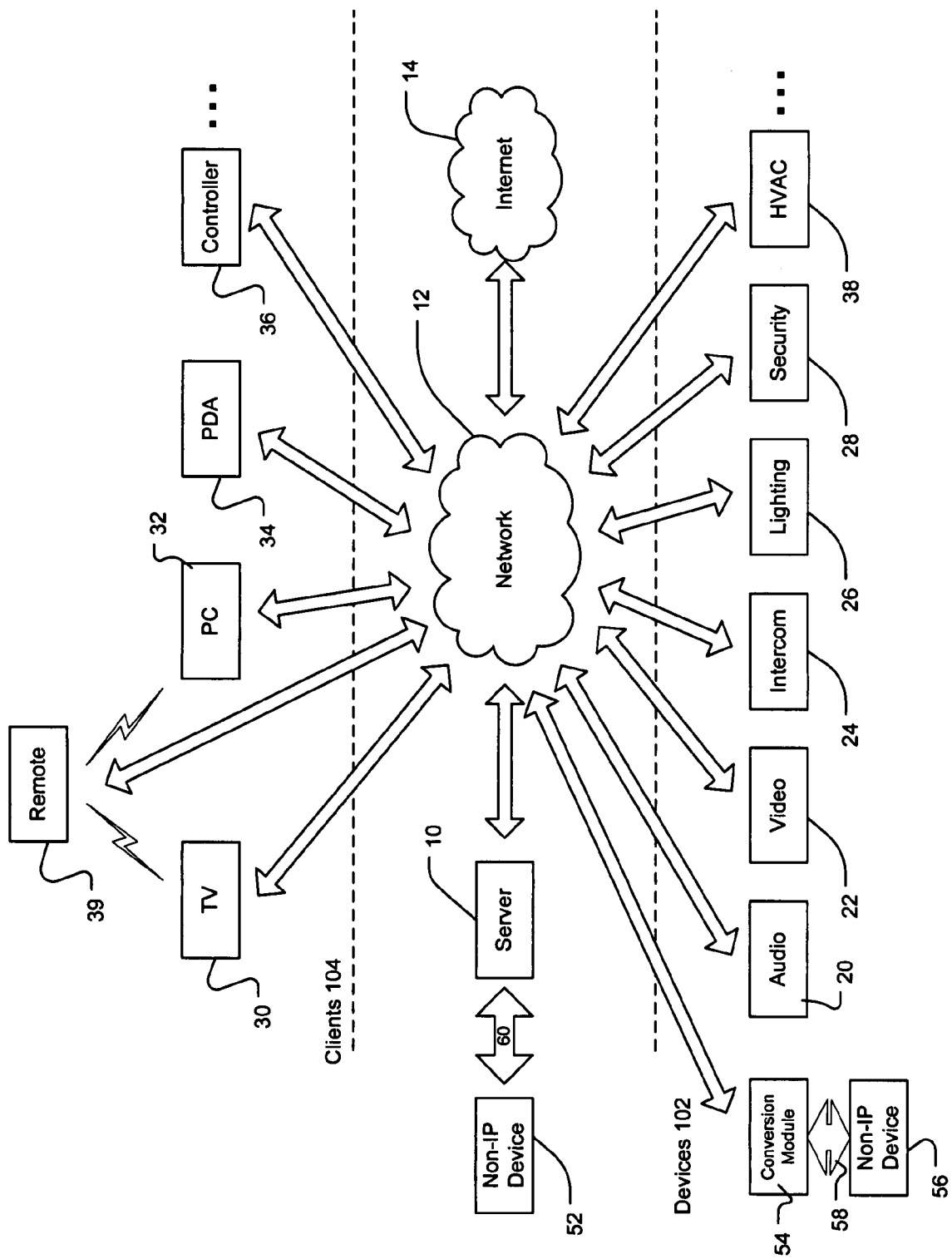
FIG. 1 shows an schematic overview of a convergence solution constructed according to the principles of the invention.

The embodiments of the invention and the various features and advantageous detail thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings.

FIG. 1 schematically shows an overview of a convergence solution according to an embodiment of the invention. The convergence solution may be a combination of hardware and software. The hardware may include a server 10 connected to a network 12 (e.g. IP based wired or wireless such as Ethernet network) and may possibly be connected to the internet 14, devices 102 (e.g. audio 20, video 22, intercom 24, lighting 26, security system 28, HVAC 38, and the like) and clients 104 (e.g. TV 30, personal computer (PC) 32, personal digital assistance (PDA) 34, controller 36 such as a control panel, game controller (i.e. X-Box™, not shown) and the like). Moreover, the clients 104 may include a remote control 39 or a remote control may be configured to be a client 104. The server 10 may be any type of computer, such as a PC connected to the network 12. The clients 104 such as clients 30, 32, 34, 36 may provide a user with control over the devices 102 such as devices 20, 22, 24, 26, 28, 38.

FIG. 1 further schematically shows interaction of the convergence a solution interacting with non-internet protocol devices such as non-internet protocol devices 52, 56. Non-internet protocol device 52 (non-IP) device is considered non-internet protocol in that it does not include a communications interface that is IP based. The non-IP device 52 may include other types of (serial, COM port, and the like) communication protocols. Accordingly, the server 10 may be configured to include various inputs and outputs to provide communication and control to various devices such as non-IP device 52. Non-IP device 52 may be implemented as any number of different devices including, for example only, window shade automation devices, audio devices, video devices and so on.

FIG. 1 further shows implementation of the convergence solution that may communicate with a non-IP device such as the non-IP device 56 that not arranged proximate to server 10. In order to accomplish communication between the non-IP device 56 and the network 12, a link or conversion module 54 may be arranged in communication with the network 12. As described in further detail below, the conversion module 54 connects to the network with an Ethernet type connection that provides internet protocol communications with the network 12. The conversion module 54 further provides a second type of communication connection as shown by 58 that may be any type of communication protocol as noted above with respect to communication protocol 60. Accordingly the non-IP device 56 may then communicate via network 12 and operate as a web service device accordingly.

The software (i.e., application) enables the hardware such as the server 10, devices 102, and clients 104 to communicate with each other despite their different proprietary languages and communication protocols, and may provide the user with control over most or all the hardware from a single client. The application may utilize at least one portion of the hardware to send commands to the devices 102 and receive feedback from them. The application may integrate centralized device control into a PC based media environment (e.g., Microsoft Media Center™ environment) that may store, organize and play digital media content. The user may use the same remote control 39 to listen to music, watch and record television, enjoy family photographs and home movies, as well as adjust the lighting, secure the home, adjust the temperature, distribute music throughout the house, check surveillance cameras and the like.

The application may be implemented with Web Services. The Web Services use standard Internet protocol (IP) and are based on standard XML-related technologies such as SOAP (Simple Object Access Protocol) for communications and WSDL (Web Services Device Language) to describe interfaces. The devices implemented with Web Service for Device (WSD) become black boxes on the network, providing services to any application, on any platform, written in any language Alternatively or additionally, if the server 10 or the PC 32 is running a SideShow™ enabled operating system such as Microsoft Windows Vista™, the devices may be configured as a SideShow™ device or "gadget." A SideShow™ device or gadget may communicate with any client or device implemented with WSD in the network via protocols according to SideShow™ XML communication specifications. Moreover, the server 10 or the PC 32 using Microsoft Windows Vista™ may be running a SideShow™ gadget application running on the Microsoft Windows Vista™ computer providing a user interface rendering for the device that communicate with automation control devices via WSD technology.

Alternatively or additionally, the WSD technology may be implemented using Device Profile for Web Services (DPWS). The DPWS may be used to define how various devices may be able to use Web Services in conjunction with the convergence solution noted above. The DPWS further may allow and/or ensure interoperability between the various devices 102 and the clients 104 and the like. Moreover, the DPWS may allow for support of resource constrained devices within the convergence solution shown in FIG. 1. One benefit of DPWS is its ability to enable device and service discovery within the convergence solution of FIG. 1. The DPWS may allow for and support rich eventing, an end point, and may be built on standards and WS specifications. More specifically, the end point may provide device/host metadata. Additionally, the DPWS specifications may include HTTP, WSDL, SOAP, WS-Discovery, WS-Addressing, WS-Eventing, WS-metadata, transfer, and the like.

Figure 2:
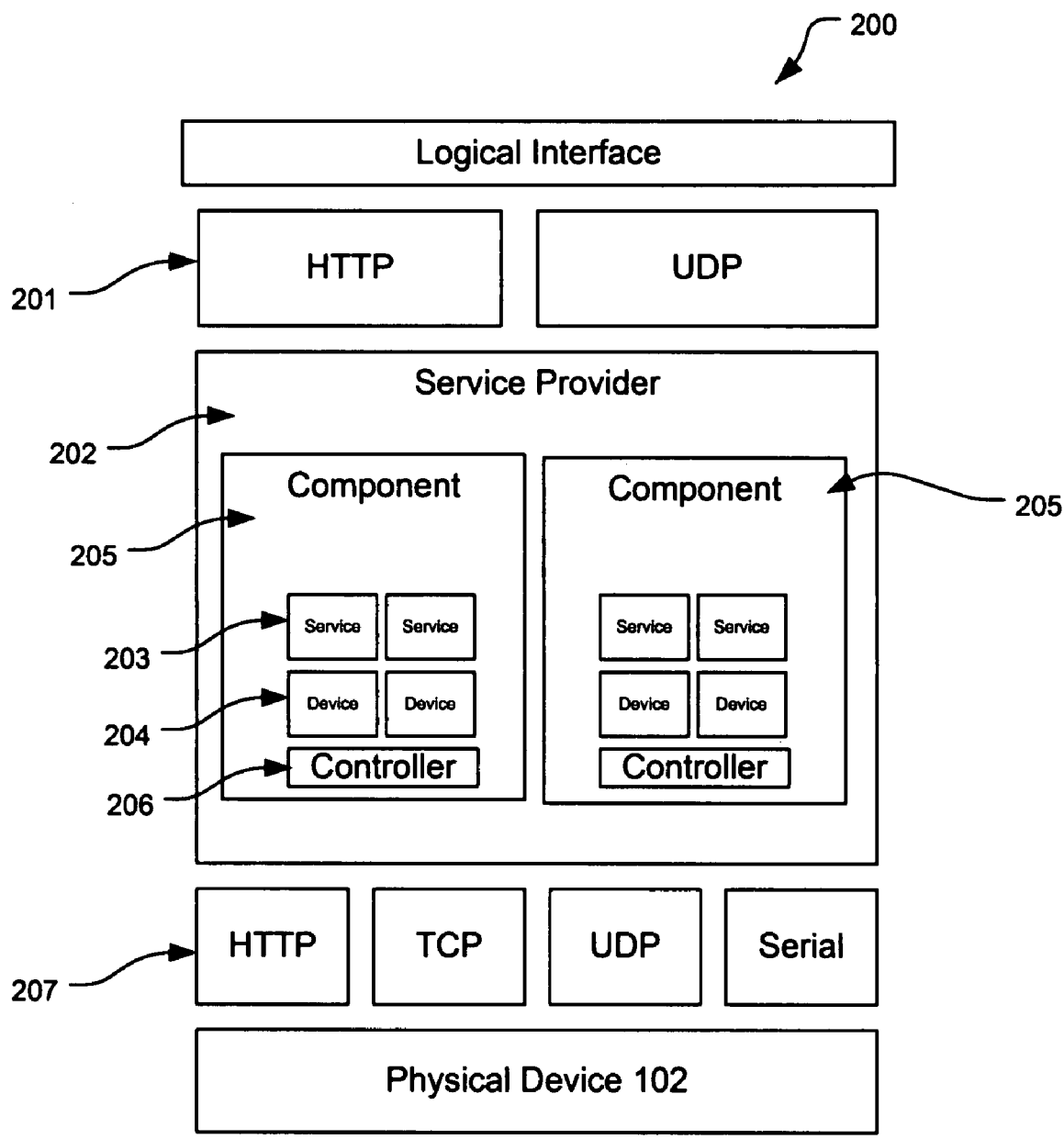
FIG. 2 schematically shows the web services for devices stack for use in the convergence solution of FIG. 1, constructed according to principles of the invention.

FIG. 2 schematically shows the Web Services for Devices (WSD) Stack for use in the convergence solution of FIG. 1, constructed according to the principles in the invention. The WSD stack as referenced herein refers to the protocol architecture. In particular, FIG. 2 shows the WSD Stack 200. The WSD stack 200 of the invention is a particular automation software implementation of a Web Services computer networking protocol suite. The individual protocols are designed with a single purpose in mind. Because each protocol module may only communicate with two others, the modules are commonly imagined as layers in a stack of protocols. The lowest protocol always deals with "low-level," physical interaction of the hardware. Every higher layer adds more features. As described in greater detail below, the WSD stack 200 allows and enables the discovery of devices in a network, such as the convergence solution of FIG. 1 and the devices on the network in a light weight, simple fashion. Using the WSD Stack 200, a device 102 in the network is able to send a message to determine what services are available enabling discovery of the device 102.

The WSD Stack 200 is the software that may be used to process protocols. The WSD Stack 200 is required to use a specific set of protocols. In particular, the WSD Stack 200 leverage Web Services for Devices to create a powerful, extensible system that may communicate with a wide variety of devices 102 described in greater detail above. As shown in FIG. 2, the WSD Stack is shown schematically at a high level. The WSD Stack 200 in FIG. 2 shows the communication to and from clients 104 at the top of the diagram via a logical interface and the various hardware devices 102 arranged at the very bottom of FIG. 2.

The logical interface initially communicates with and through the WSD Stack 200 via a Hyper Text Transfer Protocol (HTTP) or a User Datagram Protocol (UDP) as indicated by reference numeral 201. The HTTP enables data transfer and display of web pages and the like as is well known in the art. The UDP enables a direct way to send and receive datagrams on an IP network as is well known in the art. Accordingly, the clients 104 interface via the logical interface through one or both of the HTTP and UDP layers 201 to a service provider 202. For example, communication from the client 104 to the service provider 202 may be via the HTTP or UDP information and the communication may be contained in SOAP packets.

The service provider 202 may be configured as a large, generic host for web services. The service provider 202 may host one or more components 205 therein. A component 205 may have the ability to host multiple services. However, the component 205 may limit the relationship between a service and a device to a one-to-one relationship.

A further part of the component 205 is the web service 203. The web service 203 exists for each device 204. The web service 203 may be configured as a generic web service based on the device category. For example, a thermostat has a corresponding web service based on the HVAC category for example only.

Each web service 203 may be configured with a device bridge 204. The device bridge 204 may be configured to essentially translate commands by the physical devices 102. Accordingly, each device bridge 204 may be specific to the specific make of the physical device 102.

The service provider 203 may further include a controller 206. The controller 206 may be arranged to communicate with the devices 102. The controller 206 may be configured to have a ratio of one controller per component 205. The controller 206 may include the ability to send feedback from the devices 102 to the component 204. The component 204 may then route the feedback to the appropriate web service 203. Accordingly, this arrangement provides the ability for feedback from the devices 102 to various clients 104.

The service provider 202 next may communicate to the various physical devices 102 via one or more of a plurality of different communications protocol 207. In particular, the communications protocol with the devices 102 may include any type of native or proprietary format. Such native proprietary formats may be sent via Hyper Text Transfer Protocol (HTTP), transmission control protocol (TCP), user datagram protocol (UDP), or serial protocols. The TCP enables two hosts to connect. The serial protocol provides one or two way serial communication as is well known in the art.

Accordingly, the WSD Stack 200 creates a powerful and extensible system based on web services for devices. Moreover, the WSD Stack 200 may communicate with a wide variety of devices 102 as discussed in detail with respect to FIG. 1 above. Using the WSD Stack 200 allows network components to become "black box" components. This allows the various clients 104 and devices 102 to communicate in a clearly defined way without needing to know how they are accomplishing their various tasks. Using the WSD Stack 200 allows components to be implemented on any application running on any platform and written in any language. In essence, when the WSD Stack 200 is implemented, the network location and communications are handled by the platform, allowing application developers to focus solely on application problems. It should be noted that various modifications to the WSD Stack 200 are contemplated by the invention.

Figure 3:
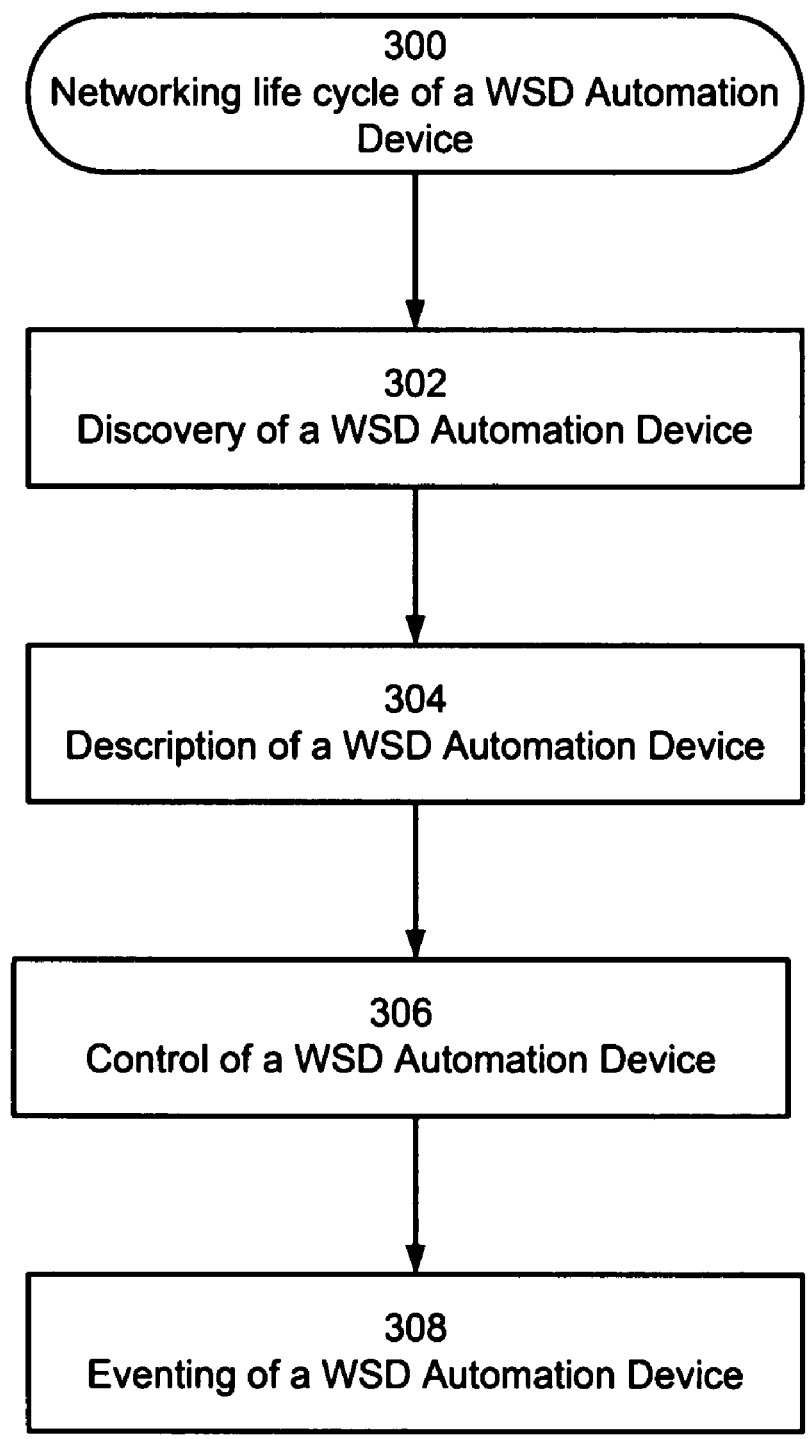
FIG. 3 shows a device life cycle operating according to the principles of the invention.
Figure 4:
FIGS. 4, 5, 6, and 7, show a automation network touch display input device constructed according to the principles of the invention.

FIG. 3 shows a device life cycle operating according to the principles of the invention. In particular, FIG. 3 shows the various portions of the life cycle of a device networking using the WSD Stack 200 described above and shown in FIG. 2 in a device 102 as shown in FIG. 1 above. Initially, as shown in FIG. 3, the first step in a device 102 in its life cycle on the network is discovery 302. Discovery 302 as used in conjunction with the WSD Stack 200 may use the WS-Discovery specification. The WS-Discovery specification may include multicast announcements, multicast query requests such as probe and probe match, and unicast responses. In this regard, a device 102 may probe a client 104 using the discovery networking life cycle 302 to receive a probe match from the client 104. In this regard, discovery of the device 102 by one or more clients 104 is straight forward and essentially automatic. More specifically, a device 102 may announce its presence as it is connected to the network 12. This announcement may be through a sending out of a hello or bye message by device 102 on to the network 12. Additionally, the device 102 may respond to a client 104 request including various probe and resolve type requests. A probe request may include the ability to identify a device or service within the client 104 or device 102. The resolve request may include the ability to locate a device 102 or service end point. The result is the ability to get or obtain information via metadata exchange during the discovery 302 process.

The next step in the networking life cycle of the WSD Stack 200 process includes the step of description 304. The step of description 304 may include a metadata exchange. This metadata exchange may be a response to a "get request." The description step 304 may thus include the WS-Metadata exchange protocol and may moreover include the WSDL or SOAP/XML information exchange. The WSDL (Web Services Description Language) may be used in combination with the SOAP and XML scheme to provide web services. A device connecting to the network 12 may read the WSDL to determine what functions are available on the network 12, clients 104 and the like. The SOAP (Simple Object Access Protocol) is a protocol that may be used for exchanging XML based messages over the network 12.

The next step in the networking life cycle shown in FIG. 3 is the step of control 306. In the step of control 306, control over a device 102 may be exercised by sending messages to the device 102 and/or services hosted by the device 102. The control 306 may be defined by the WSDL and XML schema. This definition of control 306 may ensure a common base line for interoperability.

Finally, the last step in the networking life cycle shown in FIG. 3 is the step of eventing 308. The eventing step 308 may include the WSD Stack 200 web service-eventing and may again use the SOAP/XML schema. In particular, the eventing 308 may allow for a rich eventing model. This model may allow for detailed events through WSDL. The eventing 308 may allow a client to subscribe to various events. Moreover, the eventing 308 may allow for the device 102 to push events to the clients 104.

Figure 5:
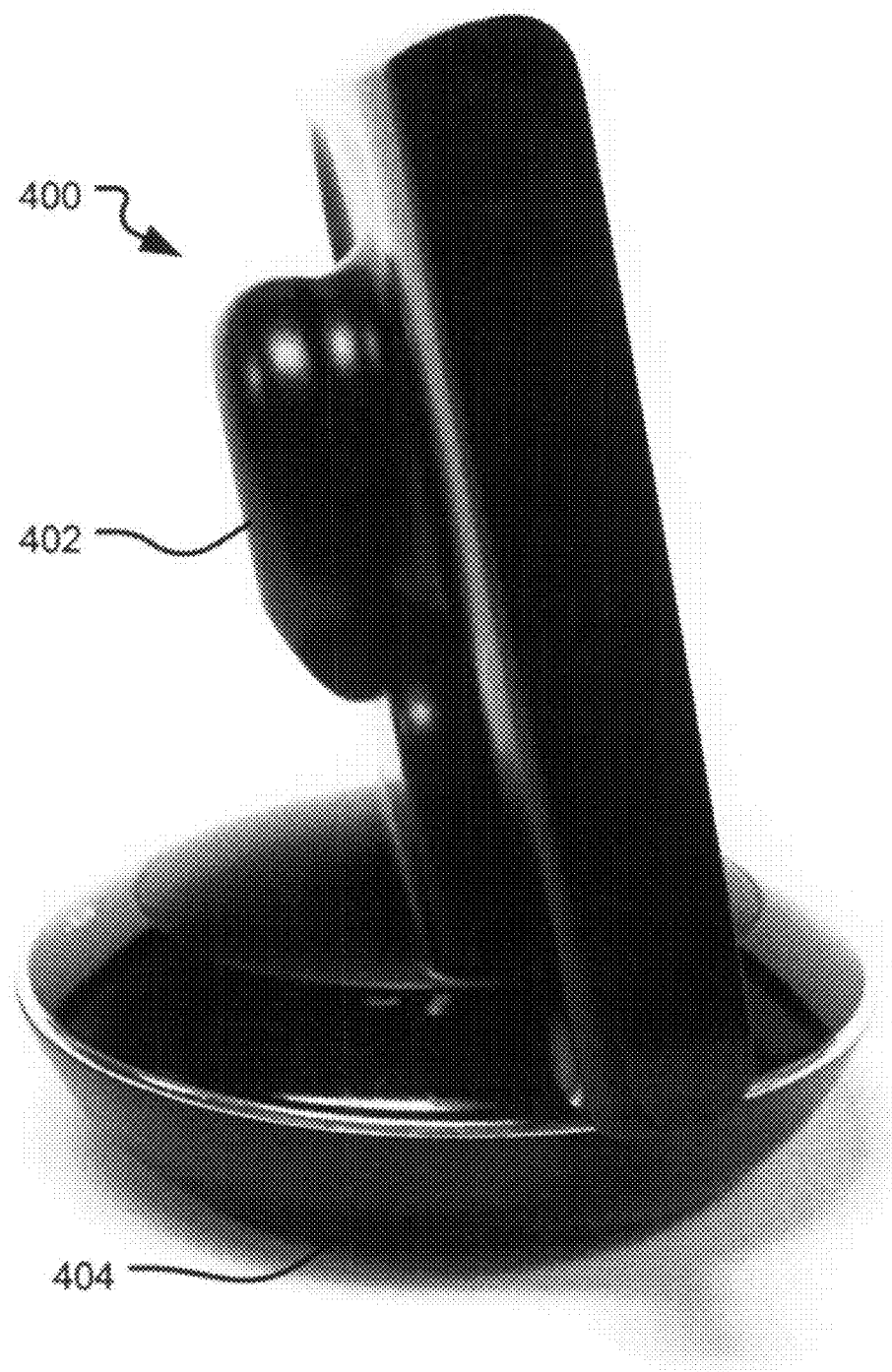
Figure 6:
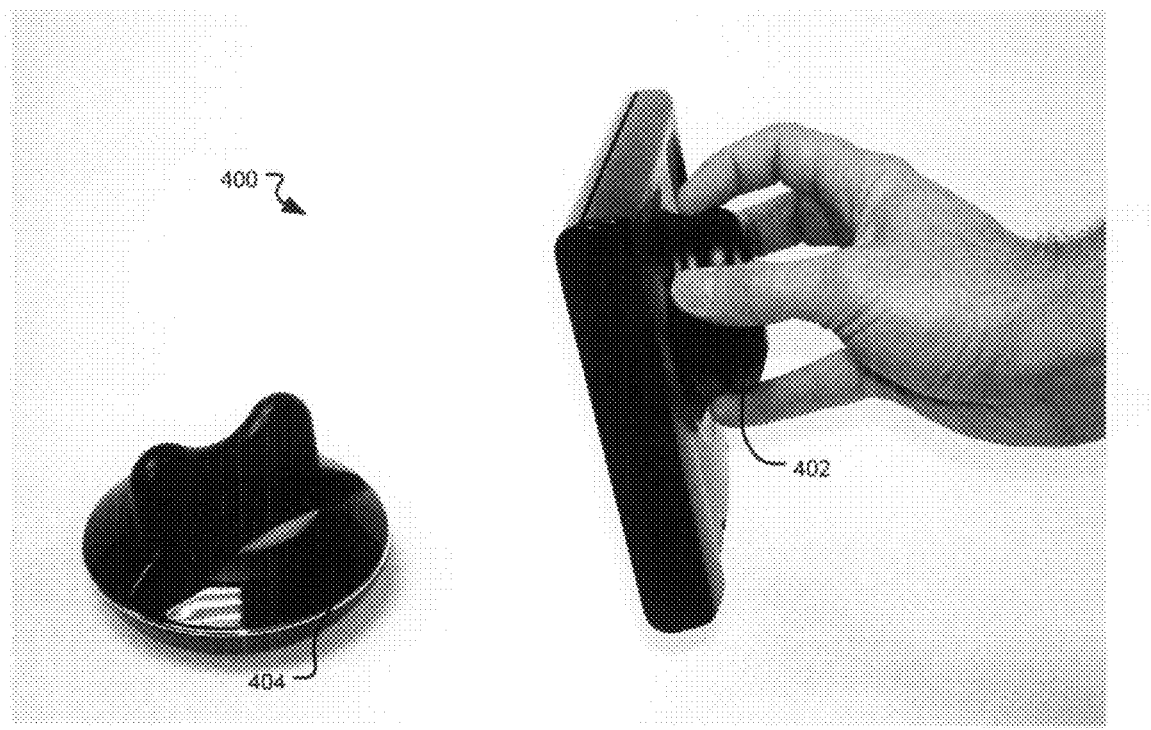
Figure 7:

Shown in FIGS. 4, 5, 6, and 7 is a client implemented as a handheld device 400 with a touch screen display 406. In particular, the handheld device 400 includes remote capability that maybe wireless. Furthermore a knob 402 may be located on the back of the handheld device 400 as shown in FIGS. 5 and 6. In particular, the knob 402 is shaped such that it may be easily held by either left or right hand (ambidextrous). Moreover, the knob 402 also may be arranged under the handheld device 400 in an arrangement such that it may prop up the handheld device on a table or another flat surface such that a user can view the display. Moreover, the knob 402 may function to hold the handheld device in a docking cradle 404. The docking cradle 404 may function as a power supply or power transformer for powering the handheld device and/ or as a connection to the network 10. Additionally, the handheld device 400 may operate using wireless fidelity (Wi-Fi) with an antenna for communication using the 802.11 protocol for example.

Figure 8:
FIG. 8 shows another automation network display input device constructed according to the principles of the invention.

As shown in FIG. 8, a handheld device 800 is another handheld client. In particular, the handheld 800 may include a power-over Ethernet (POE) connection or may be battery operated for wireless connections. Moreover, one side of the handheld 800 may include a navigation pad 802 that may include buttons (such as up, down, left, right, and select). There may also be a back button. In this aspect, it may not have a touch sensitive display. The handheld 800 may be wall mounted, it may be an IPAQ (available from Hewlett-Packard, Palo Alto, Calif.) or a PDA based device. The handheld 800 may be wired by Ethernet, or may be a Wi-Fi or wireless connected device using any known protocol such as 802.11. the handheld 800 may also allow for the distribution of audio wirelessly (receive music and distribute the same through the automation network). Moreover, it is contemplated that the handheld 800 may have a headphone jack for distribution of music via headphone. The handheld 800 may also be configured to be placed in the same or a different docking cradle 402 as noted above.

Figure 9:
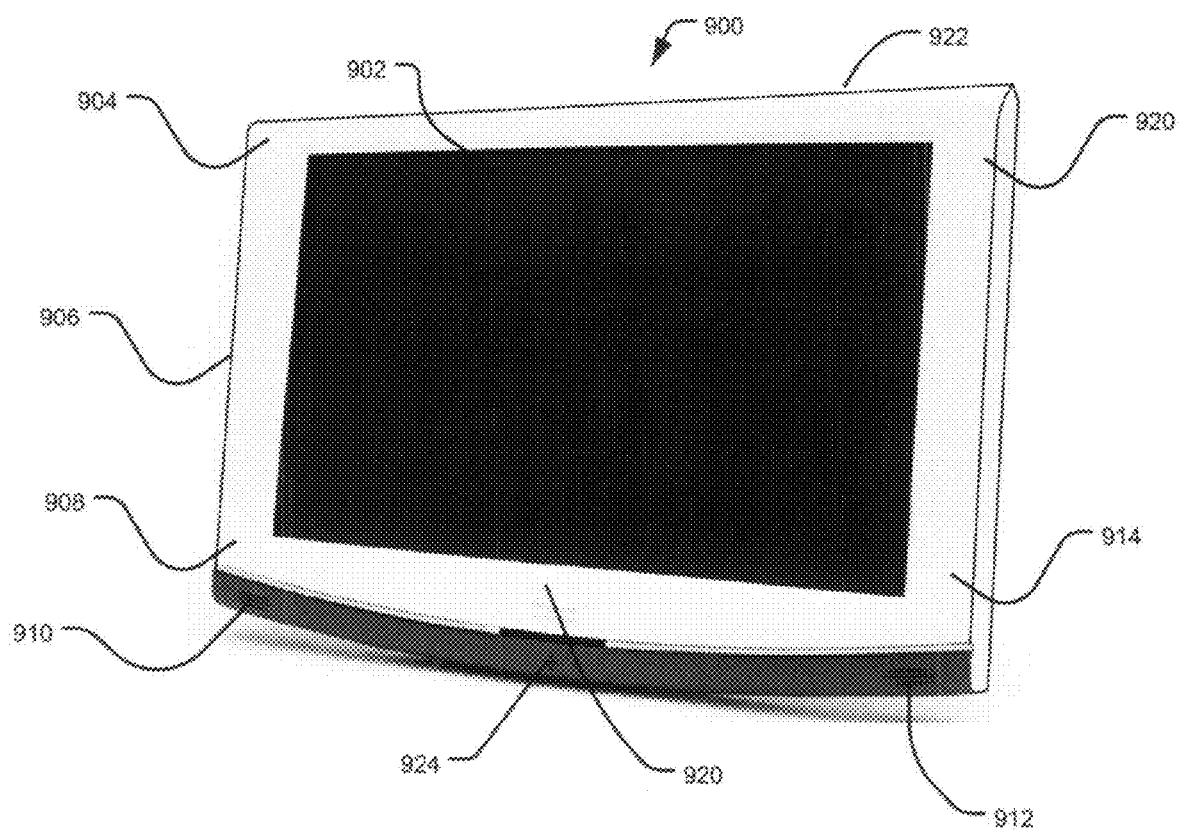
FIG. 9 shows another automation network touch display constructed according to the principles of the invention.

Another exemplary client is shown in FIG. 9 implemented as a touch screen 900 that may include a touch screen housing 922 that may include key holes and keys to interact with each other and to hold the touch screen in place in a wall without any other mechanical fasteners (not shown). Additionally, the touch screen 900, because it is web based, requires only an Ethernet connection and a power connection. In particular, the Ethernet connection may be a typical RJ45-type connection. Whereas the power connection may be a 14-16 gauge-type wire pair connecting to a DC power source (12 volts), and the like. The touch screen 900 may be a notebook based type of processor. For example, an Intel™ Pentium M-type or Core™ duo processor with the touch screen 900. The touch screen 900 may include a sensor arrangement overlaid on the display 902. Additionally, the touch screen may include an audio line out type of arrangement including speakers 910, 912. Moreover, the touch screen 900 may be arranged with a plurality of USB type connections for communication therewith. Finally, the touch screen 900 may also be configured to have a virtual QWERTY type keyboard that may be virtually arranged on the touch screen 900 for entry of alpha-numeric characters.

The touch screen monitor 900 includes a display 902. The display 902 may be an LCD type display. However, any other type of display technology is contemplated for use as the display 902. The touch screen 900 further includes a plurality of hot spots 904, 908, 918, 914, and 920. In particular, the hotspots provide a way in which to receive input from a user by touching a part of the housing 922. The hotspots 904, 908, 918, 914, and 920 are capacitive sensing. However, any type of touch sensitive technology is contemplated for use with the invention. Each of these hotspots 904, 908, 918, 914, and 920 may be assigned a particular feature. For example, turning on the lights, turning on a stereo, turning on the television and the like for each hot spot. It should be noted that the any of the above-noted devices may be controlled by the hotspots.

Additionally, the touch screen display 900 includes slider areas 906, 916. These slider areas 906, 916 may use a capacitive sensing type sensor to sense a sliding input. Sliding the finger up or down the areas 906, 916, provides a decreasing actuation of a particular home automation component such as lights or audio volume. It should be noted that the any of the above-noted devices may be controlled by the sliders. The display 902 further includes a touch sensitive capacitive overlay that may allow a user to touch various virtual buttons that are formed on the front of the display 902. Moreover, the touch screen 900 may include a microphone 924 for receiving audio input for intercom functions and the like.

Each of the display devices 400, 800, and 900 may include a CPU, CPU board, a base board, a hard drive, heat-sink, and a blower fan controlled based on internal temperature. An exhaust opening for directing the exhaust air from the blower fan may be arranged on the devices 400, 800, and 900. The touch screen may include an IR (infrared) receiver constructed according to the principles of the invention. In particular, the IR receiver device may be for receiving an IR signal to control the devices 400, 800, and 900. It is contemplated that the touch screen may allow this type of IR input arrangement to allow a remote control to interact with the devices 400, 800, and 900. Finally, it is contemplated that the touch screen might be voice activated to receive voice commands/inputs and be able to operate in response thereto. Additionally, the devices 400, 800, and 900 may include a photocell may be included to sense ambient light to control the display brightness of the devices 400, 800, and 900.

Figure 10:
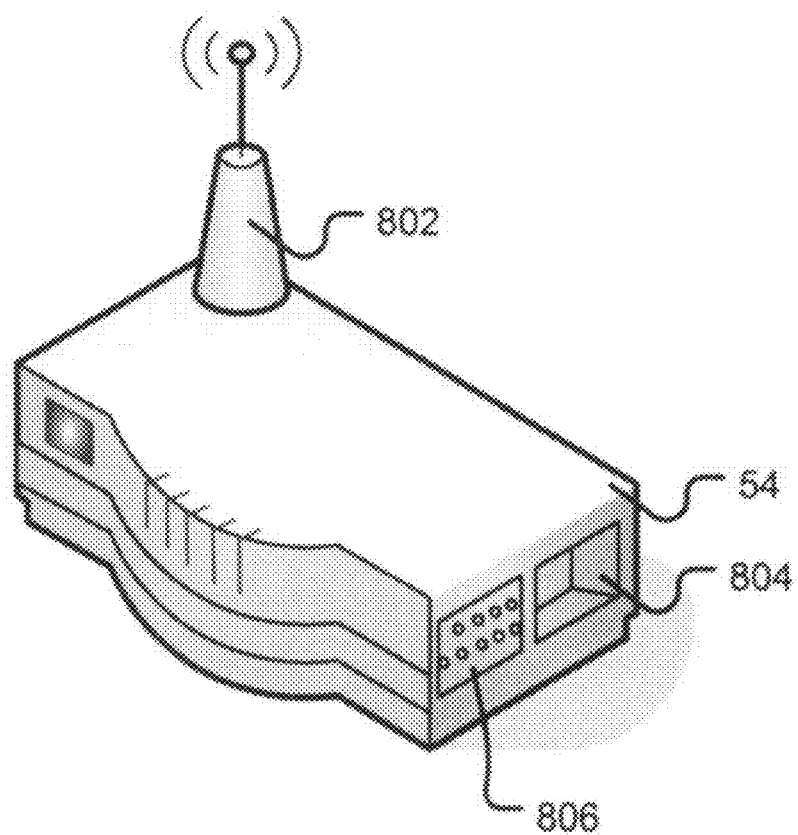
FIG. 10 shows a link module constructed according to the principles of the invention.

A FIG. 10 shows an exemplary link or conversion module constructed accordingly to the principles of the invention. In particular, the conversion module 54 is constructed to connect with the network 12 using IP protocol and, in particular WSD. The conversion module 54 connects to the network 12 either via a wireless connection through antenna 802 using any known wireless protocol such as a Wi-Fi or a wired connection through a jack 804. The conversion module 54 includes a memory, a processor, an operating system, and so on. The operating system of the conversion module 54 allow for the use of the WSD stack 200. The conversion module 54 also includes a communications connection 806. The communications connection 806 may use any kind of proprietary and/or serial type connections or communication. Accordingly, a device that may not be able to connect to a network 12 because it lacks an IP protocol type of interface, may be able to connect to the conversion module 54 through the communication connection 806. Accordingly that device becomes a black box on the network and be able to accordingly interact with the network using web services for devices.

Accordingly, the application and clients as described above, may be implemented with Web Services for Devices and in particular the above noted WSD Stack 200. The Web Services for Devices (WSD) uses standard Internet protocol (IP) and may be based on standard XML-related technologies such as SOAP (Simple Object Access Protocol) for communications and WSDL (Web Services Device Language) to describe interfaces. The devices implemented with WSD Stack 200 become black boxes on the network, providing services to any application, on any platform, written in any language.

In accordance with various embodiments of the invention, the methods described herein are intended for operation with dedicated hardware implementations including, but not limited to, semiconductors, application specific integrated circuits, programmable logic arrays, and other hardware devices constructed to implement the methods and modules described herein. Moreover, various embodiments of the invention described herein are intended for operation with as software programs running on a computer processor. Furthermore, alternative software implementations including, but not limited to, distributed processing or component/object distributed processing, parallel processing, virtual machine processing, any future enhancements, or any future protocol can also be used to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

What is claimed is:

1. A process of operating an automation system in a Web Service environment, comprising the steps of:
providing at least one client and at least one device, the at least one client and the at least one device configured with a web services for devices (WSD) protocol;
connecting a network comprising at least one server configured with the WSD stack to the at least one client and the at least one device; and
transmitting automation-based control and communication between the at least one client and at least one device,
wherein the at least one client comprises one of a touch screen display and a handheld controller and the at least one device comprises an audio system, a video system, an intercom system, a lighting system, a security system, a link, and a HVAC system,
wherein the WSD stack comprises:
a first communication layer configured to logically interface the at least one automation client;
a second communication layer configured to physically interface the at least one automation device; and
a service provider layer comprising one or more components, each component corresponding to a device category, wherein each component comprises:
one or more Web Services corresponding to one or more automation devices of the corresponding device category, respectively, each Web Service configured to function as a Web Service host for the corresponding automation device;
one or more device bridges corresponding to the one or more Web Services, respectively, each device bridge configured to translate communication between the corresponding Web Service and automation device; and
a controller configured to communicate with the one or more automation devices of the corresponding device category.

2. The process according to claim 1 wherein one of the touch screen display and the handheld controller comprise at least one of a LCD display, processor, wireless interface, wired interface, IR interface, audio system, inputs, support base, and knob.

3. The process according to claim 1 wherein the at least one client further comprises one of a TV, a personal computer, a personal digital assistant, and a game controller.

4. The process according to claim 1 wherein the first and second communication layers process at least one of a Hypertext Transfer Protocol (HTTP), a Transmission Control Protocol (TCP), a User Datagram Protocol (UDP), and serial protocols.

5. The process according to claim 1 wherein the WSD stack is configured to discover the at least one client and the discovery comprises one of multicast announcements, multicast query requests, and unicast responses.

6. The process according to claim 1 wherein the WSD stack is configured for description and the description comprises at least one of WS-Metadata exchange, web services description language, and simple object access protocol/XML protocol.

7. The process according to claim 1 wherein the WSD stack is configured for eventing and wherein the eventing comprises at least one of web services description language for detailed events, a configuration for client subscription to events, and a configuration for the at least one device to push events to the at least one client.

8. A machine-readable tangible storage medium comprising instructions stored therewith, which, when executed by a processor cause the processor to establish an automation system in a Web Service environment, the machine-reachable medium comprising:
instructions for providing automation-based control and communication between at least one client and at least one device, the at least one client and the at least one device configured with a web services for devices (WSD) stack configured to the at least one client and at least one device; and
instructions for configuring a network comprising at least one server to be connected to the at least one client and the at least one device with the WSD stack,
wherein the at least one client comprises one of a touch screen display and a handheld controller and the at least one device comprises an audio system, a video system, an intercom system, a lighting system, a security system, a link, and a HVAC system,
wherein the WSD stack comprises:
a first communication layer configured to logically interface the at least one automation client;
a second communication layer configured to physically interface the at least one automation device; and
a service provider layer comprising one or more components, each component corresponding to a device category, wherein each component comprises:
one or more Web Services corresponding to one or more automation devices of the corresponding device category, respectively, each Web Service configured to function as a Web Service host for the corresponding automation device;
one or more device bridges corresponding to the one or more Web Services, respectively, each device bridge configured to translate communication between the corresponding Web Service and automation device; and
a controller configured to communicate with the one or more automation devices of the corresponding device category.

9. The machine-readable tangible storage medium according to claim 8 wherein one of the touch screen display and the handheld controller comprise at least one of a LCD display, processor, wireless interface, wired interface, IR interface, audio system, inputs, support base, and knob.

10. The machine-readable tangible storage medium according to claim 8 wherein the at least one client further comprises one of a TV, a personal computer, a personal digital assistant, and a game controller.

11. The machine-readable tangible storage medium according to claim 8 wherein the first and second communication layers process at least one of a Hypertext Transfer Protocol (HTTP), a Transmission Control Protocol (TCP), a User Datagram Protocol (UDP), and serial protocols.

12. The machine-readable tangible storage medium according to claim 8 wherein the WSD stack is configured to discover the at least one client and the discovery comprises one of multicast announcements, multicast query requests, and unicast responses.

13. The machine-readable tangible storage medium according to claim 8 wherein the WSD stack is configured for description and the description comprises at least one of WS-Metadata exchange, web services description language, and simple object access protocol/XML protocol.

14. The machine-readable tangible storage medium according to claim 8 wherein the WSD stack is configured for eventing and wherein the eventing comprises at least one of web services description language for detailed events, a configuration for client subscription to events, and a configuration for the at least one device to push events to the at least one client.

15. An automation system operating in a Web Service for Devices environment, comprising:
   at least one client and at least one device, the at least one client and the at least one device configured with a web services for devices (WSD) stack configured to provide automation-based control and communication between the at least one client and at least one device; and
   a network comprising at least one server configured to be connected to the at least one client and the at least one device with the WSD stack,
   wherein the at least one client comprises one of a touch screen display and a handheld controller and the at least one device comprises an audio system, a video system, an intercom system, a lighting system, a security system, a link, and a HVAC system,
   wherein the WSD stack comprises:
      a first communication layer configured to logically interface the at least one automation client;
      a second communication layer configured to physically interface the at least one automation device; and
      a service provider layer comprising one or more components, each component corresponding to a device category, wherein each component comprises:
         one or more Web Services corresponding to one or more automation devices of the corresponding device category, respectively, each Web Service configured to function as a Web Service host for the corresponding automation device;
         one or more device bridges corresponding to the one or more Web Services, respectively, each device bridge configured to translate communication between the corresponding Web Service and automation device; and
         a controller configured to communicate with the one or more automation devices of the corresponding device category.

16. The automation system according to claim 15 wherein one of the touch screen display and the handheld controller comprise at least one of a LCD display, processor, wireless interface, wired interface, IR interface, audio system, inputs, support base, and knob.

17. The automation system according to claim 15 wherein the at least one client further comprises one of a TV, a personal computer, a personal digital assistant, and a game controller.

18. The automation system according to claim 15 wherein the first and second communication layers process at least one of a Hypertext Transfer Protocol (HTTP), a Transmission Control Protocol (TCP), a User Datagram Protocol (UDP), and serial protocols.

19. The automation system according to claim 15 wherein the WSD stack is configured to discover the at least one client and the discovery comprises one of multicast announcements, multicast query requests, and unicast responses.

20. The automation system according to claim 15 wherein the WSD stack is configured for description and the description comprises at least one of WS-Metadata exchange, web services description language, and simple object access protocol/XML protocol.

21. The automation system according to claim 15 wherein the WSD stack is configured for eventing and wherein the eventing comprises at least one of web services description language for detailed events, a configuration for client subscription to events, and a configuration for the at least one device to push events to the at least one client.

22. The process of claim 1, wherein the WSD stack is configured for:
   discovery of the at least one automation client, the discovery comprises one of multicast announcements, multicast query requests, and unicast responses;
   description comprising at least one of WS-Metadata exchange, web services description language, and simple object access protocol/XML protocol; and
   eventing comprising at least one of web services description language for detailed events, a configuration for automation client subscription to events, and a configuration for the at least one automation device to push events to the at least one automation client.

23. The machine-readable tangible storage medium of claim 8, wherein the WSD stack is configured for:
   discovery of the at least one automation client, the discovery comprises one of multicast announcements, multicast query requests, and unicast responses;
   description comprising at least one of WS-Metadata exchange, web services description language, and simple object access protocol/XML protocol; and
   eventing comprising at least one of web services description language for detailed events, a configuration for automation client subscription to events, and a configuration for the at least one automation device to push events to the at least one automation client.

24. The automation system of claim 15, wherein the WSD stack is configured for:
   discovery of the at least one automation client, the discovery comprises one of multicast announcements, multicast query requests, and unicast responses;
   description comprising at least one of WS-Metadata exchange, web services description language, and simple object access protocol/XML protocol; and
   eventing comprising at least one of web services description language for detailed events, a configuration for automation client subscription to events, and a configuration for the at least one automation device to push events to the at least one automation client.

* * * * *